US005995925A

United States Patent [19]

Emori

[11] Patent Number: 5,995,925

[45] Date of Patent: Nov. 30, 1999

[54] VOICE SPEED CONVERTER

[75] Inventor: Tadashi Emori, Tokyo, Japan

[73] Assignee: NEC Corporation, Tokyo, Japan

[21] Appl. No.: 08/931,533

[22] Filed: Sep. 16, 1997

[30] Foreign Application Priority Data

Sep. 17, 1996 [JP] Japan .................................... 8-243935

[51] Int. Cl.[6] ........................................................ G01L 3/02

[52] U.S. Cl. ........................... 704/208; 704/214; 704/215

[58] Field of Search ..................................... 704/207, 208, 704/210, 211, 214, 215

[56] References Cited

U.S. PATENT DOCUMENTS

| | | | |
|---|---|---|---|
| 4,890,325 | 12/1989 | Taniguchi et al. | 704/208 |
| 5,448,679 | 9/1995 | McKiel, Jr. | 704/208 |
| 5,717,818 | 2/1998 | Nejime et al. | 704/211 |
| 5,781,881 | 7/1998 | Stegman | 704/211 |
| 5,809,454 | 9/1998 | Okada et al. | 704/208 |
| 5,809,455 | 9/1998 | Nishiguchi et al. | 704/211 |
| 5,828,994 | 10/1998 | Covell et al. | 704/211 |
| 5,828,995 | 10/1998 | Satyamurti et al. | 704/211 |
| 5,864,793 | 1/1999 | Mesiwala et al. | 704/214 |

FOREIGN PATENT DOCUMENTS

| | | |
|---|---|---|
| 1-93795 | 4/1989 | Japan . |
| 5-80796 | 4/1993 | Japan . |
| 7-121985 | 12/1995 | Japan . |
| 8-045177 | 2/1996 | Japan . |
| 8-147874 | 7/1996 | Japan . |

OTHER PUBLICATIONS

"Speech Speed Cponversion Technique in the Pratical Stage, Fundamental Function of the Speech Output Device", Nikkei Electronics, 1994, 11, 21, pp. 93–98.

Funakai et al., "4 kbps Low Bit Rate Speech Response System", NEC Technical Report, vol. 48, No. Jun. 1995, pp. 10–13.

Furui, S., "Digital Speech Processing", Tokai University Publisher, pp. 122–124.

Malah, D., "Time–Domain Algorithms for Harmonic Bandwidth Reduction and Time Scaling of Speech Signals," IEEE Transactions on Acoustics, Speech, and Signal Processing, vol. ASSP–27, No. 2, Apr. 1979, pp. 121–133.

*Primary Examiner*—David R. Hudspeth
*Assistant Examiner*—Martin Lerner
*Attorney, Agent, or Firm*—Scully, Scott Murphy & Presser

[57] ABSTRACT

A voice speed converter comprising a speech classifying unit for classifying an input speech signal into an unvoiced part and another part, a pitch frequency extracting unit for extracting a pitch frequency from the input speech signal and supplying it, a quasi-pitch frequency supplying unit for supplying a quasi-pitch frequency of fixed length, a voice speed converter for performing voice speed conversion processing on the input speech signal by the use of the pitch frequency or the quasi-pitch frequency, and a switch for controlling switching operations according to the classification result by the speech classifying unit, so as to send the quasi-pitch frequency to the voice speed converter when the input speech signal belongs to the unvoiced part, or so as to send the pitch frequency to the voice speed converter when the input speech signal belongs to another part.

10 Claims, 8 Drawing Sheets

VOICE SPEED CONVERTER

BACKGROUNDS OF THE INVENTION

1. Field of the Invention

The present invention relates to a voice speed converter that can change only the reproduction speed of speech without changing the pitch and tone of the speech, and more particularly to a voice speed converter improved in the accuracy of processing the fricative sound, explosive sound or other unvoiced sound in speech.

2 Description of the Related Art

The voice speed conversion technique is the technique for reproducing speech with the speed of the speech only changed without changing the pitch and tone of the speech as if the same talker were speaking slowly or fast. The article "Speech Speed Conversion Technique in the Practical Stage, Fundamental Function of the Speech Output Device" (NIKKEI ELECTRONICS, 1994. 11. 21, pp. 93–98) introduces a VTR, a hearing aid, and an answering machine by the use of this kind of voice speed conversion technique. Further there is the description of such fundamental principle of the voice speed converter that the fundamental speech waveform repeated periodically (frequency wave pattern) is extracted and the frequency wave pattern is inserted or deleted without affecting the frequency (pitch frequency). The article "4 kbps Low Bit Rate Speech Response System" (written by Funaki et al, NEC Technical Report, Vol. 48, No. 6/1995, pp. 10–13) describes an example in which the voice speed conversion technique is used in the speech encoding and decoding technique for storing the digitalized speech data.

As a concrete method of processing the waveform by the unit of pitch frequency, there are a method of repeating or thinning out the waveform of speech signal by the unit of pitch frequency and the TDHS (time-domain harmonic scaling) method of cutting out the speech signal in every pitch frequency for the window operation by the use of the window function and thereafter overlapping each other. By reference to the article "Digital Speech Processing" (written by Sadahiro Furui, Tokai University Publisher, pp. 122–124), the TDHS method compresses and decompresses the information by multiplying each adjacent pitch segment by the adequate weight that varies according to the position on the time axis with consideration of time continuity for the fusing.

In the voice speed converter employed for the waveform processing by the unit of pitch frequency, a speech signal is classified into some parts and the voice speed conversion processing is switched depending on the characteristic of the speech signal of the respective parts, for the purpose of the improvement in the sound quality. This kind of the conventional voice speed conversion technique is disclosed in, for example, Japanese Patent Publication Laid-Open (Kokai) No. Heisei 1-93795, "Voice Speed Conversion Method of Speech". The voice speed conversion technique disclosed in the same publication divides an input speech signal into a sound part having the sound and a soundless part having no sound. If an input speech signal belongs to the sound part, the pitch frequency of the speech signal is required by the use of the autocorrelation method or the like, and the voice time length is made longer or shorter by the waveform repetition or the waveform thinning-out processing by the unit of the same pitch frequency. If an input speech signal belongs to the soundless part, the voice time length is made longer or shorter by the waveform repetition or the waveform thinning-out processing according to a predetermined ratio of making longer and shorter. Thereafter, a desired speech wave pattern is obtained by connecting the speech signal in each part having the voice time length adjusted.

Besides, another conventional voice speed conversion technique is disclosed in Japanese Patent Publication Laid-Open (Kokai) No. Heisei 5-80796, "Speech Speed Controlled Pacing Method and Its Device".

The voice speed conversion method disclosed in the same publication further divides the sound part of an input speech signal into a voiced part having the voice sound such as vowel and an unvoiced part having the unvoiced sound such as fricative sound and explosive sound. If an input speech signal belongs to the voiced part, the pitch frequency is extracted by the use of the autocorrelation method, the voice time length is made longer or shorter by performing the waveform processing by the unit of the resultant pitch frequency. If an input speech signal belongs to the soundless part, the voice time length is made longer or shorter by the waveform repetition or waveform thinning-out processing according to a predetermined radio of making longer and shorter. If an input speech signal belongs to the unvoiced part, the voice time length is left as it is, in order to maintain the personality and phonemic of a talker.

As mentioned above, the voice speed converter disclosed in the publication No. 1-93795 requires the pitch frequency also in the unvoiced part. Since there exists no pitch frequency in this part, the extracted pitch frequency results in an extremely large value or small value. Therefore, the waveform repetition or waveform thinning-out processing in every pitch frequency by the use of the extracted pitch frequency in this part results in the very extensive thinning-out or repetition processing, or the very intensive one, which causes the tone rough and spoils the sound quality extremely.

The voice speed conversion method disclosed in the publication No. 5-80796 performs no voice speed conversion processing in the unvoiced part, so that it can prevent from the deterioration in the sound quality caused by the extraction error of pitch frequency. However, since the voice time length is not changed in the unvoiced part, the voice speed changes partially, resulting in the unnaturally reproduced speech on hearing.

Further, unchanged voice time length in the unvoiced part causes the decrease in the possible parts of changing the voice time length on the whole, resulting in decreasing the freedom of controlling the voice speed conversion power.

SUMMARY OF THE INVENTION

An object of the present invention is to provide a voice speed converter capable of realizing the stable speed conversion in the unvoiced part and obtaining output signals of high sound quality.

Another object of the present invention is, in addition to the above object, to provide a voice speed converter capable of preventing from making the reproduced speech unnatural hearing and preventing from decreasing the freedom of controlling the voice speed conversion power.

According to one aspect of the invention, a voice speed converter that performs voice speed conversion processing of changing only the reproduction speed of an input speech signal without changing the pitch and tone of the voice, comprises a speech classifying means for classifying the input speech signal at least into an unvoiced part and another part and supplying classification information indicating the classification result, a pitch frequency extracting means for extracting a pitch frequency of the input speech signal and supplying it, a quasi-pitch frequency supplying means for supplying a quasi-pitch frequency of a predetermined fixed length value, a voice speed converting means for performing the voice speed conversion processing on the input speech signal by the use of the pitch frequency supplied from the pitch frequency extracting means or the quasi-pitch frequency supplied from the quasi-pitch frequency supplying means and supplying the speech signal having voice time length converted, and a switching means for controlling switching operations according to the classification information supplied from the speech classifying means, so as to send to the voice speed converting means the quasi-pitch frequency supplied from the quasi-pitch frequency supplying means when the input speech signal belongs to the unvoiced part, or so as to send to the voice speed converting means the pitch frequency supplied from the pitch frequency extracting means when the input speech signal belongs to another part.

The quasi-pitch frequency supplied from the quasi-pitch frequency supplying means may take an arbitrary value selected from the range of pitch frequencies obtained based on the possible frequency band of the human voice.

In the preferred construction, the speech classifying means for classifying the input speech signal into a soundless part, a voiced part of a sound part, and an unvoiced part thereof and supplying the classification result as the classification information, the switching means for controlling switching operations according to the classification information supplied from the speech classifying means, so as to send to the voice speed converting means the quasi-pitch frequency supplied from the quasi-pitch frequency supplying means when the input speech signal belongs to the unvoiced part, or so as to send to the voice speed converting means the pitch frequency supplied from the pitch frequency extracting means when the input speech belongs to the voiced part, wherein further comprises a soundless processing means for simply making the voice time length of the input speech signal longer and shorter corresponding to a long to short ratio of the voice time length in the processing by the voice speed converting means and supplying the same, and a second switching means for controlling switching operations according to the classification information supplied from the speech classifying means, so as to supply the voice speed-converted speech signal supplied from the voice speed converting means when the input speech signal belongs to the unvoiced part or the voiced part, or so as to supply the speech signal after the soundless processing, supplied from the soundless processing means when the input speech signal belongs to the soundless part.

In the preferred construction, the speech classifying means for classifying the input speech signal into a soundless part, a voiced part of a sound part, and an unvoiced part thereof and supplying the classification result as the classification information, the switching means for controlling switching operations according to the classification information supplied from the speech classifying means, so as to send to the voice speed converting means the quasi-pitch frequency supplied from the quasi-pitch frequency supplying means when the input speech signal belongs to the unvoiced part, or so as to send to the voice speed converting means the pitch frequency supplied from the pitch frequency extracting means when the input speech belongs to the voiced part, wherein further comprises a soundless processing means for simply making the voice time length of the input speech signal longer and shorter corresponding to a long to short ratio of the voice time length in the processing by the voice speed converting means and supplying the same, and a second switching means for controlling switching operations according to the classification information supplied from the speech classifying means, so as to supply the voice speed-converted speech signal supplied from the voice speed converting means when the input speech signal belongs to the unvoiced part or the voiced part, or so as to supply the speech signal after the soundless processing, supplied from the soundless processing means when the input speech signal belongs to the soundless part, wherein the quasi-pitch frequency supplied from the quasi-pitch frequency supplying means takes an arbitrary value selected from the range of pitch frequencies obtained based on the possible frequency band of the human voice.

According to another aspect of the invention, a voice speed converter performing voice speed conversion processing of changing only the reproduction speed of an input speech signal without changing the pitch and tone of the voice, comprises a speech classifying means for classifying the input speech signal at least into an unvoiced part and another part and supplying classification information indicating the classification result, a pitch frequency extracting means for extracting a pitch frequency of the input speech signal and supplying it, a quasi-pitch frequency supplying means for receiving a pitch frequency that is the output from the pitch frequency extracting means with respect to the part other than the unvoiced part, according to the classification information supplied from the speech classifying means and supplying a quasi-pitch frequency of fixed length obtained based on the pitch frequency, a voice speed converting means for performing the voice speed conversion processing on the input speech signal by the use of the pitch frequency supplied from the pitch frequency extracting means or the quasi-pitch frequency supplied from the quasi-pitch frequency supplying means and supplying the speech signal having voice time length converted, and a switching means for controlling switching operations according to the classification information supplied from the speech classifying means, so as to send to the voice speed converting means the quasi-pitch frequency supplied from the quasi-pitch frequency supplying means when the input speech signal belongs to the unvoiced part, or so as to send to the voice speed converting means the pitch frequency supplied from the pitch frequency extracting means when the input speech signal belongs to another part.

The quasi-pitch frequency supplied from the quasi-pitch frequency supplying means may take the average value of the pitch frequencies received from the pitch frequency extracting means.

Also, the quasi-pitch frequency supplied from the quasi-pitch frequency supplying means may take the representative value selected according to a predetermined rule from the pitch frequencies received from the pitch frequency extracting means.

In the preferred construction, the speech classifying means for classifying the input speech signal into a soundless part, a voiced part of a sound part, and an unvoiced part thereof and supplying the classification result as the classification information, the switching means for controlling switching operations according to the classification information supplied from the speech classifying means, so as to send to the voice speed converting means the quasi-pitch frequency supplied from the quasi-pitch frequency supplying means when the input speech signal belongs to the unvoiced part, or so as to send to the voice speed converting means the pitch frequency supplied from the pitch frequency extracting means when the input speech belongs to the voiced part, wherein further comprises a soundless processing means for simply making the voice time length of the input speech signal longer and shorter corresponding to a long to short ratio of the voice time length in the processing by the voice speed converting means and supplying the same, and a second switching means for controlling switching operations according to the classification information supplied from the speech classifying means, so as to supply the voice speed-converted speech signal supplied from the voice speed converting means when the input speech signal belongs to the unvoiced part or the voiced part, or so as to supply the speech signal after the soundless processing, supplied from the soundless processing means when the input speech signal belongs to the soundless part.

In the preferred construction, the speech classifying means for classifying the input speech signal into a soundless part, a voiced part of a sound part, and an unvoiced part thereof and supplying the classification result as the classification information, the switching means for controlling switching operations according to the classification information supplied from the speech classifying means, so as to send to the voice speed converting means the quasi-pitch frequency supplied from the quasi-pitch frequency supplying means when the input speech signal belongs to the unvoiced part, or so as to send to the voice speed converting means the pitch frequency supplied from the pitch frequency extracting means when the input speech belongs to the voiced part, and wherein further comprises a soundless processing means for simply making the voice time length of the input speech signal longer and shorter corresponding to a long to short ratio of the voice time length in the processing by the voice speed converting means and supplying the same, and a second switching means for controlling switching operations according to the classification information supplied from the speech classifying means, so as to supply the voice speed-converted speech signal supplied from the voice speed converting means when the input speech signal belongs to the unvoiced part or the voiced part, or so as to supply the speech signal after the soundless processing, supplied from the soundless processing means when the input speech signal belongs to the soundless part, wherein the quasi-pitch frequency supplied from the quasi-pitch frequency supplying means takes the average value of the pitch frequencies received from the pitch frequency extracting means.

In another preferred construction, the speech classifying means for classifying the input speech signal into a soundless part, a voiced part of a sound part, and an unvoiced part thereof and supplying the classification result as the classification information, the switching means for controlling switching operations according to the classification information supplied from the speech classifying means, so as to send to the voice speed converting means the quasi-pitch frequency supplied from the quasi-pitch frequency supplying means when the input speech signal belongs to the unvoiced part, or so as to send to the voice speed converting means the pitch frequency supplied from the pitch frequency extracting means when the input speech belongs to the voiced part, wherein further comprises a soundless processing means for simply making the voice time length of the input speech signal longer and shorter corresponding to a long to short ratio of the voice time length in the processing by the voice speed converting means and supplying the same, and a second switching means for controlling switching operations according to the classification information supplied from the speech classifying means, so as to supply the voice speed-converted speech signal supplied from the voice speed converting means when the input speech signal belongs to the unvoiced part or the voiced part, or so as to supply the speech signal after the soundless processing, supplied from the soundless processing means when the input speech signal belongs to the soundless part, wherein the quasi-pitch frequency supplied from the quasi-pitch frequency supplying means takes the representative value selected according to a predetermined rule from the pitch frequencies received from the pitch frequency extracting means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
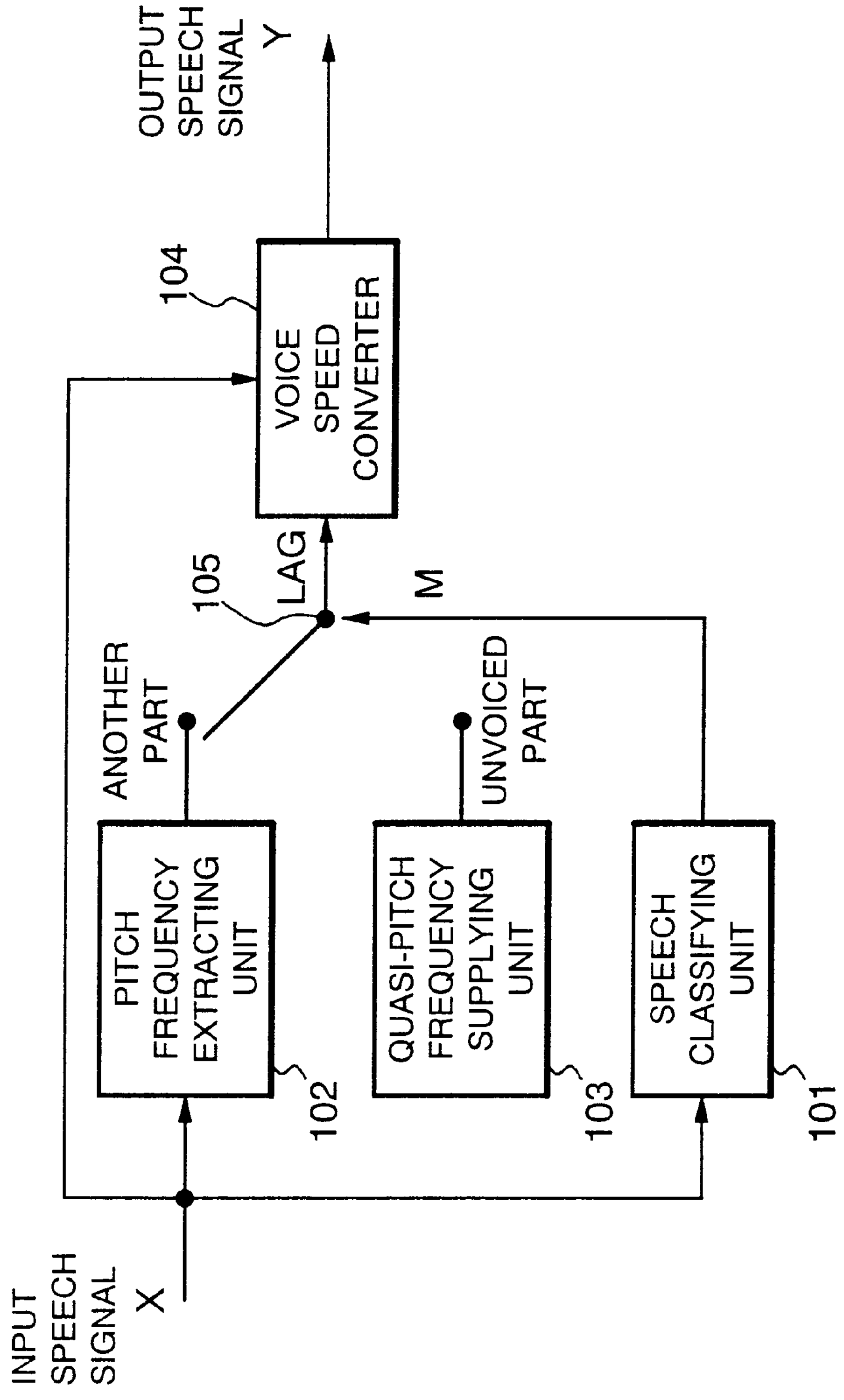
FIG. 1 is a block diagram showing the constitution of a voice speed converter according to a first embodiment of the present invention.

FIG. 1 is a block diagram showing the constitution of a voice speed converter according to a first embodiment of the present invention.

In reference to FIG. 1, the voice speed converter of the embodiment comprises a speech classifying unit 101 for classifying an input speech signal into an unvoiced part and another part, a pitch frequency extracting unit 102 for extracting the pitch frequency of the speech signal, a quasi-pitch frequency supplying unit 103 for supplying a predetermined quasi-pitch frequency, a voice speed converter 104 for changing the speed of the input speech signal according to the pitch frequency supplied from the pitch frequency extracting unit 102 or the quasi-pitch frequency supplied from the quasi-pitch frequency supplying unit 103, and a switch 105 for switching the connecting relation; the voice speed converter 104—the pitch frequency extracting unit 102 and the voice speed converter 104—the quasi-pitch frequency supplying unit 103. FIG. 1 shows only the characteristic components of the embodiment, while omitting the description of the other general components.

Of the above components, the speech classifying unit 101, the pitch frequency extracting unit 102, the quasi-pitch frequency supplying unit 103, and the voice speed converter 104 are realized by a program-controlled CPU and an internal memory such as a RAM or the like. The computer program for controlling a CPU is provided stored in a storing medium such as a magnetic disk, a semiconductor memory or the like, and each function executing unit is realized by loading the computer program into the internal memory. The speech classifying unit 101 classifies an input speech signal X into an unvoiced part and another part, and supplies the classification result to the switch 105 as the classification information M. The classification method of speech signal is the same as the conventional voice speed conversion technique. For example, a speech signal is classified into a sound part and a soundless part depending on the existence of sound power and the sound part is further classified into an unvoiced part and a voiced part depending on the analytical result of the PARCOR analysis or the zero crossing point analysis.

The pitch frequency extracting unit 102 extracts the pitch frequency of the input speech signal X and supplies the extracted pitch frequency LAG to the voice speed converter 104 through the switch 105. The extracting method of the pitch frequency is the same as the conventional voice speed conversion technique. For example, sampled value extracted from the speech signal X is operated by the window function, and the autocorrelation method can be used in which the correlation function is required to perform the linear prediction analysis of speech.

The quasi-pitch frequency supplying unit 103 supplies the predetermined quasi-pitch frequency to the voice speed converter 104 as the pitch frequency LAG.

The quasi-pitch frequency is determined by selecting one average value in the range of pitch frequencies obtained based on the possible frequency band of the human voice.

Therefore, the pitch frequency LAG supplied from the quasi-pitch frequency supplying unit 103 becomes fixed value.

The voice speed converter 104 receives the input speech signal X and the pitch frequency LAG supplied from the pitch frequency extracting unit 102 or the quasi-pitch frequency supplying unit 103, performs the TDHS processing by the use of the pitch frequency LAG, and supplies the output speech signal Y having the voice time length made longer or shorter in response to a user's request.

The switch 105 sends to the voice speed converter 104, either the pitch frequency LAG supplied from the pitch frequency extracting unit 102 or that one supplied from the quasi-pitch frequency supplying unit 103 selectively, according to the classification information M supplied from the speech classifying unit 101. More specifically, when the classification information M designates an unvoiced part, the switch 105 sends the pitch frequency LAG supplied from the quasi-pitch frequency supplying unit 103, to the voice speed converter 104, and when the classification information M designates another part, the switch 105 is turned to send the pitch frequency LAG supplied from the pitch frequency extracting unit 102, to the voice speed converter 104.

Figure 2:
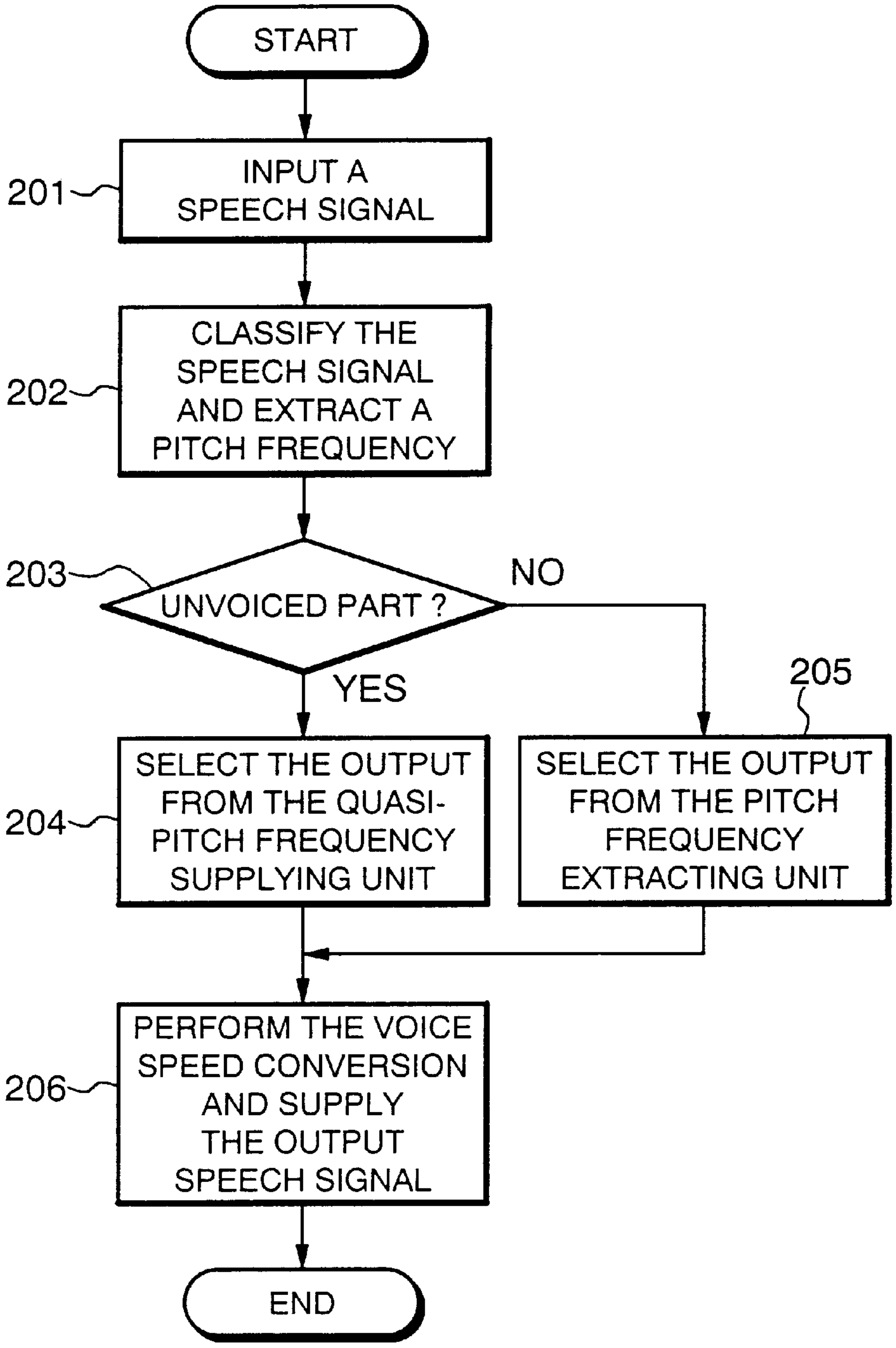
FIG. 2 is a flow chart showing the operation of the first embodiment.

This time, the operation of the voice speed converter of the embodiment will be described with reference to the flow chart of FIG. 2.

According to the embodiment, upon receipt of the input speech signal X (Step 201), the speech classifying unit 101 classifies the input speech signal X into an unvoiced part and another part, so to supply the classification information M. Simultaneously, the pitch frequency extracting unit 102 extracts the pitch frequency of the input speech signal X and supplies the pitch frequency LAG (Step 202). The quasi-pitch frequency supplying unit 103 is continuously supplying the predetermined pitch frequency LAG, regardless of the presence of the speech signal input and the presence of the processing by the speech classifying unit 101.

The switch 105 connects either the pitch frequency extracting unit 102 or the quasi-pitch frequency supplying unit 103 to the voice speed converter 104 according to the classification information M, so as to send the pitch frequency LAG (Steps 203, 204, and 205).

The voice speed converter 104 converts the voice speed of the input speech signal X in response to a user's request by the use of the pitch frequency LAG received through the switch 105, so to supply the output speech signal Y (Step 206).

In the above description, although the quasi-pitch frequency supplying unit 103 is designed to supply the pitch frequency LAG continuously, regardless of the presence of the speech signal input and the presence of the processing by the speech classifying unit 101, it may be designed to start the output of the pitch frequency LAG upon detecting the input of a speech signal and stop the output of the pitch frequency LAG upon detecting the absence of the input of the speech signal.

Figure 3:
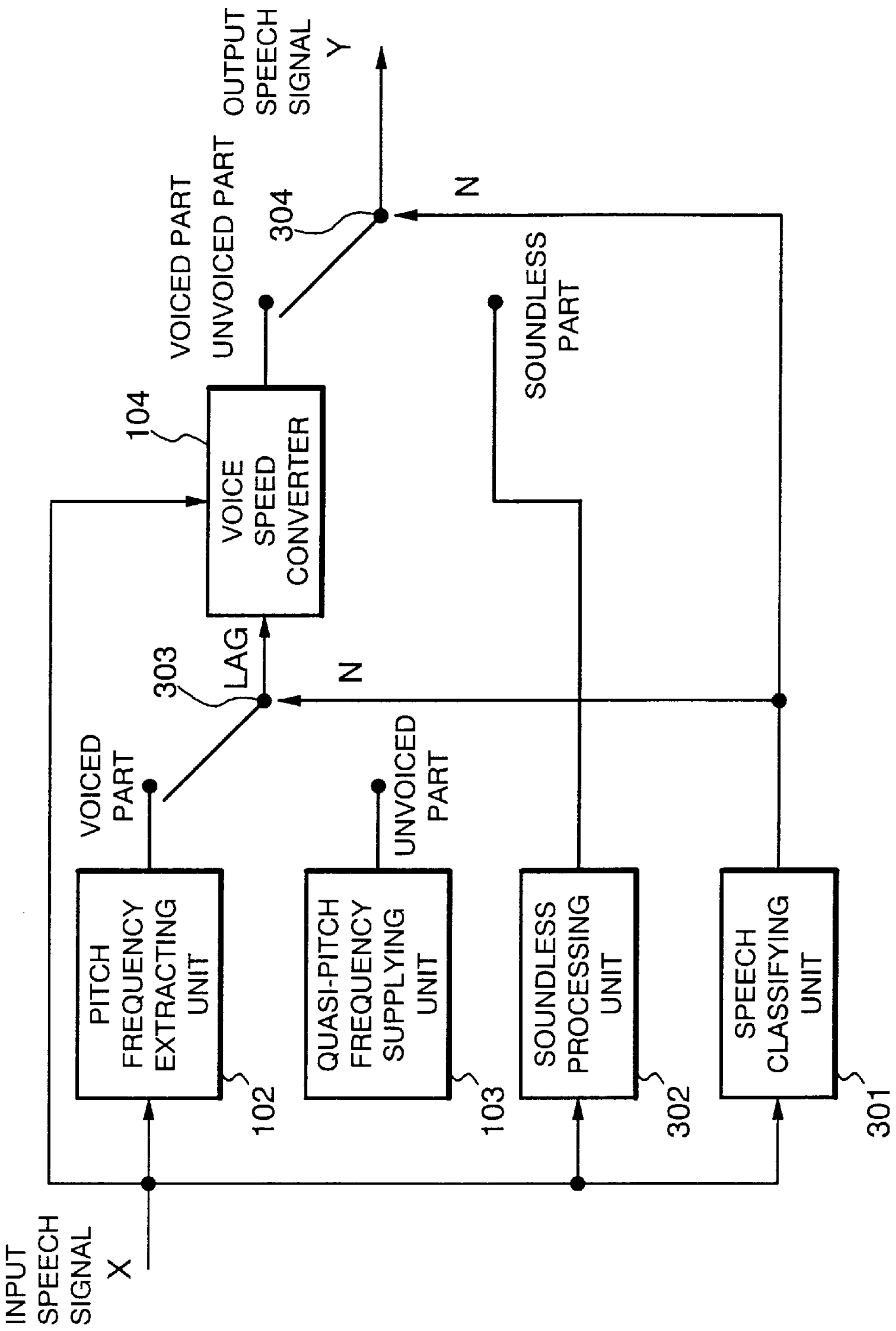
FIG. 3 is a block diagram showing the constitution of a voice speed converter according to a second embodiment of the present invention.

FIG. 3 is a block diagram showing the constitution of a voice speed converter according to a second embodiment of the present invention.

In reference to FIG. 3, the voice speed converter of the embodiment comprises a speech classifying unit 301 for classifying an input speech signal into an unvoiced part, a voiced part, and a soundless part, a soundless processing unit 302 for performing soundless processing on the input speech signal, a pitch frequency extracting unit 102 for extracting the pitch frequency of the speech signal, a quasi-pitch frequency supplying unit 103 for supplying a predetermined quasi-pitch frequency, a voice speed converter 104 for changing the speed of the input speech signal according to the pitch frequency supplied from the pitch frequency extracting unit 102 or the quasi-pitch frequency supplied from the quasi-pitch frequency supplying unit 103, a first switch 303 for switching the connecting relation; the pitch frequency extracting unit 102—the voice speed converter 104 and the quasi-pitch frequency supplying unit 103—the voice speed converter 104, and a second switch 304 for supplying either the speech signal having the speed converted by the voice speed converter 104 or the speech signal having the soundless processing performed by the soundless processing unit 302 selectively as the output speech signal. FIG. 3 shows only the characteristic components of the embodiment, while omitting the description of the other general components.

Of the above components, the speech classifying unit 301 and the soundless processing unit 302 are realized by a program-controlled CPU and an internal memory such as a RAM or the like. The pitch frequency extracting unit 102, the quasi-pitch frequency supplying unit 103, and the voice speed converter 104 have the same constitution as the corresponding components of the above-mentioned first embodiment, thereby omitting the description thereof with the same reference numerals respectively attached thereto.

The speech classifying unit 301 classifies the input speech signal X into an unvoiced part, a voiced part, and a soundless part, so to supply the classification result to the first switch 303 and the second switch 304 as the classification information N.

The classifying method of speech signal is the same as the conventional voice speed conversion technique.

The soundless processing unit 302 receives the input speech signal X, makes the time length of the speech longer or shorter while doing the waveform repetition or waveform thinning-out processing, according to the ratio of making the time length longer or shorter determined in response to a user's request, and supplies the speech signal. Of the speech signal, that one belonging to the soundless part is subject to the processing by the soundless processing unit 302 here, so that the pitch frequency makes no matter and the speech time length can be made longer or shorter according to the demanded ratio only.

The first switch 303 selectively supplies to the voice speed converter 104, either the pitch frequency LAG supplied from the pitch frequency extracting unit 102 or that one supplied from the quasi-pitch frequency supplying unit 103, according to the classification information N supplied from the speech classifying unit 301. More specifically, when the classification information N designates the unvoiced part, the first switch 303 sends the pitch frequency LAG supplied by the quasi-pitch frequency supplying unit 103, to the voice speed converter 104, and when the classification information N designates the voiced part, the first switch 303 sends the pitch frequency LAG supplied by the pitch frequency extracting unit 102, to the voice speed converter 104. When the classification information N designates the soundless part, the first switch 303 performs no switching operation.

The second switch 304 supplies either the speech signal having the speed changed by the voice speed converter 104 or the speech signal having the speed changed by the soundless processing unit 302 as the output speech signal Y. More specifically, when the classification information N designates the unvoiced part or voiced part, the speech signal supplied from the voice speed converter 104 is supplied as the output speech signal Y, and when the classification information N designates the soundless part, the speech signal supplied from the soundless processing unit 302 is supplied as the output speech signal Y. When the classification information N designates the unvoiced part or the voiced part, the second switch 304 does not perform any switching operation.

Figure 4:
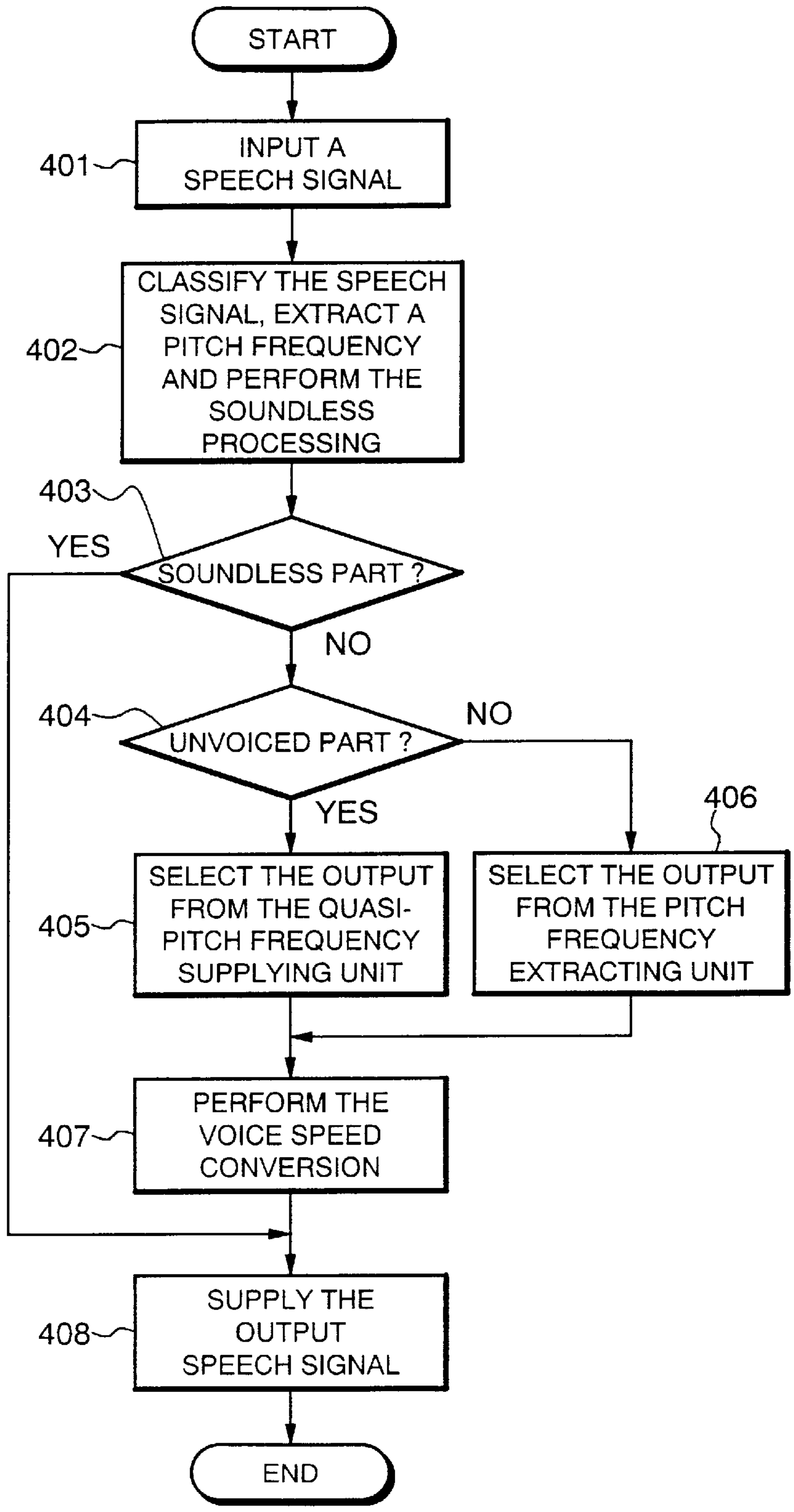
FIG. 4 is a flow chart showing the operation of the second embodiment.

This time, the operation of the voice speed converter of the embodiment will be described with reference to the flow chart of FIG. 4.

According to the embodiment, the speech classifying unit 301, upon receipt of the input speech signal X (Step 401), classifies the input speech signal X into an unvoiced part, a voiced part, and a soundless part, so to supply the classification information N.

Simultaneously, the pitch frequency extracting unit 102 extracts the pitch frequency from the input speech signal X and supplies the pitch frequency LAG. Further, the soundless processing unit 302 performs the soundless processing on the speech signal according to a user's request and supplies it (Step 402). The predetermined pitch frequency LAG is supplied from the quasi-pitch frequency supplying unit 103.

Next, the second switch 304 changes the supply from the voice speed converter 104 or from the soundless processing unit 302 according to the classification information N (Step 403). The first switch 303 connects either the pitch frequency extracting unit 102 or the quasi-pitch frequency supplying unit 103 to the voice speed converter 104 according to the classification information N (Steps 404, 405, and 406).

The voice speed converter 104 converts the voice speed of the input speech signal X according to a user's request by the use of the pitch frequency LAG received through the switch 303, and supplies it (Step 407).

Finally, either the output of the voice speed converter 104 or the output of the soundless processing unit 302 is supplied as the output speech signal Y depending on the state of the second switch 304 (Step 408).

Figure 5:
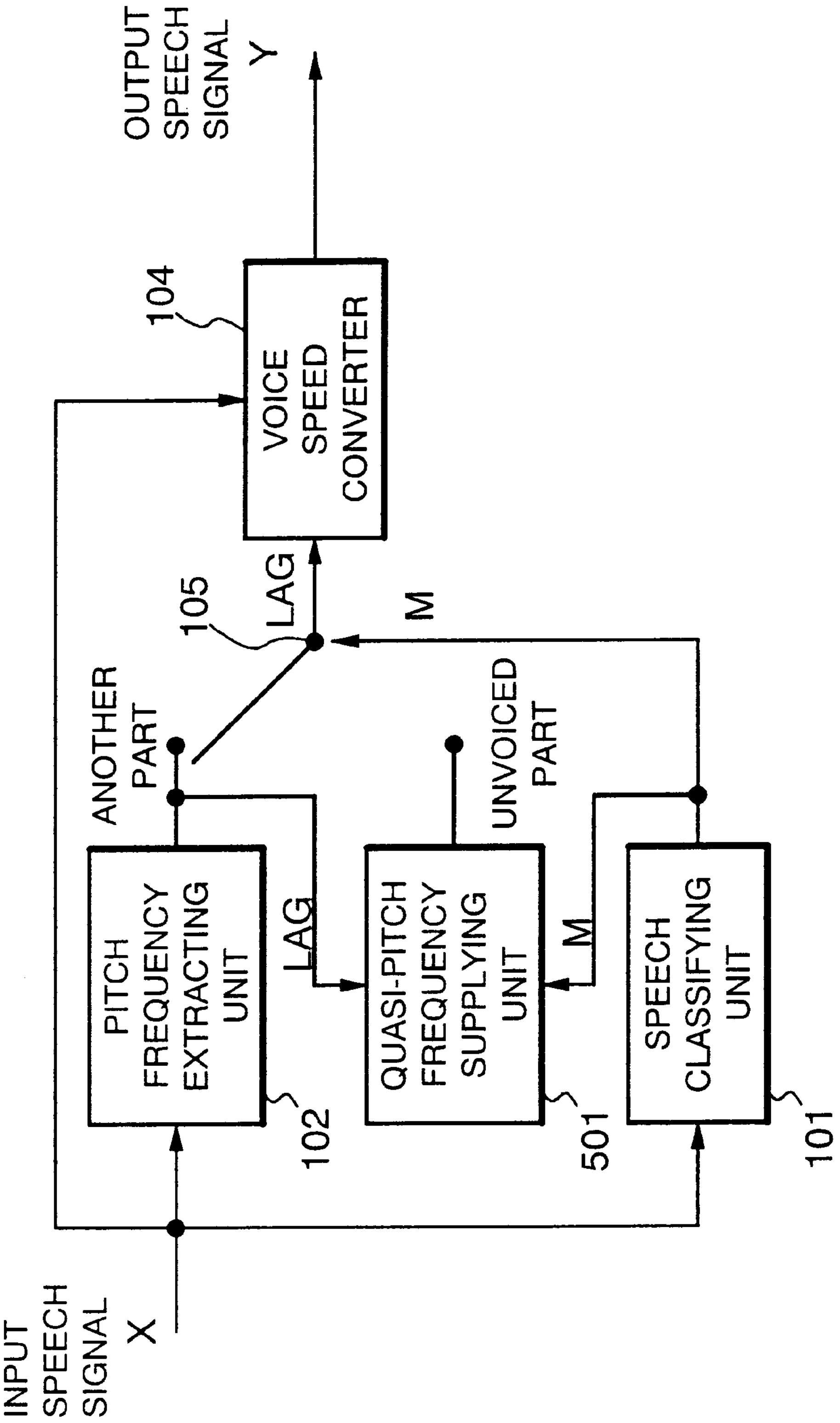
FIG. 5 is a block diagram showing the constitution of a voice speed converter according to a third embodiment of the present invention.

FIG. 5 is a block diagram showing the constitution of a voice speed converter according to a third embodiment of the present invention.

In reference to FIG. 5, the voice speed converter of the embodiment comprises a speech classifying unit 101 for classifying an input speech signal into an unvoiced part and another part, a pitch frequency extracting unit 102 for extracting the pitch frequency of the speech signal, a quasi-pitch frequency supplying unit 501 for supplying the quasi-pitch frequency determined according to the extraction result of the pitch frequency extracting unit 102, a voice speed converter 104 for changing the speed of the input speech signal according to the pitch frequency supplied from the pitch frequency extracting unit 102 or the quasi-pitch frequency supplied from the quasi-pitch frequency supplying unit 501, and a switch 105 for switching the connecting relation; the voice speed converter 104—the pitch frequency extracting unit 102 and the voice speed converter 104—the quasi-pitch frequency supplying unit 501. FIG. 5 shows only the characteristic components of the embodiment, while omitting the description of the other general components.

Of the above components, the quasi-pitch frequency supplying unit 501 is realized by a program-controlled CPU and an internal memory such as a RAM or the like. The speech classifying unit 101, the pitch frequency extracting unit 102, the voice speed converter 104, and the switch 105 have the same structure as the respective components of the first embodiment mentioned above, so that the description thereof is omitted with the same reference numerals respectively attached thereto.

The quasi-pitch frequency supplying unit 501 receives the pitch frequency LAG that is the output from the pitch frequency extracting unit 102 with respect to the part other than the unvoiced part on the basis of the classification information M supplied from the speech classifying unit 101, and the quasi-pitch frequency obtained by calculating the average value of the same pitch frequency LAG is supplied as the pitch frequency LAG. By the use of the average value of the pitch frequency obtained with respect to the other part than the unvoiced part as the quasi-pitch frequency, this embodiment can obtain the quasi-pitch frequency more exactly fitting for the quality and tone of the input speech signal X compared with the first and second embodiments using the fixed quasi-pitch frequency.

Figure 6:
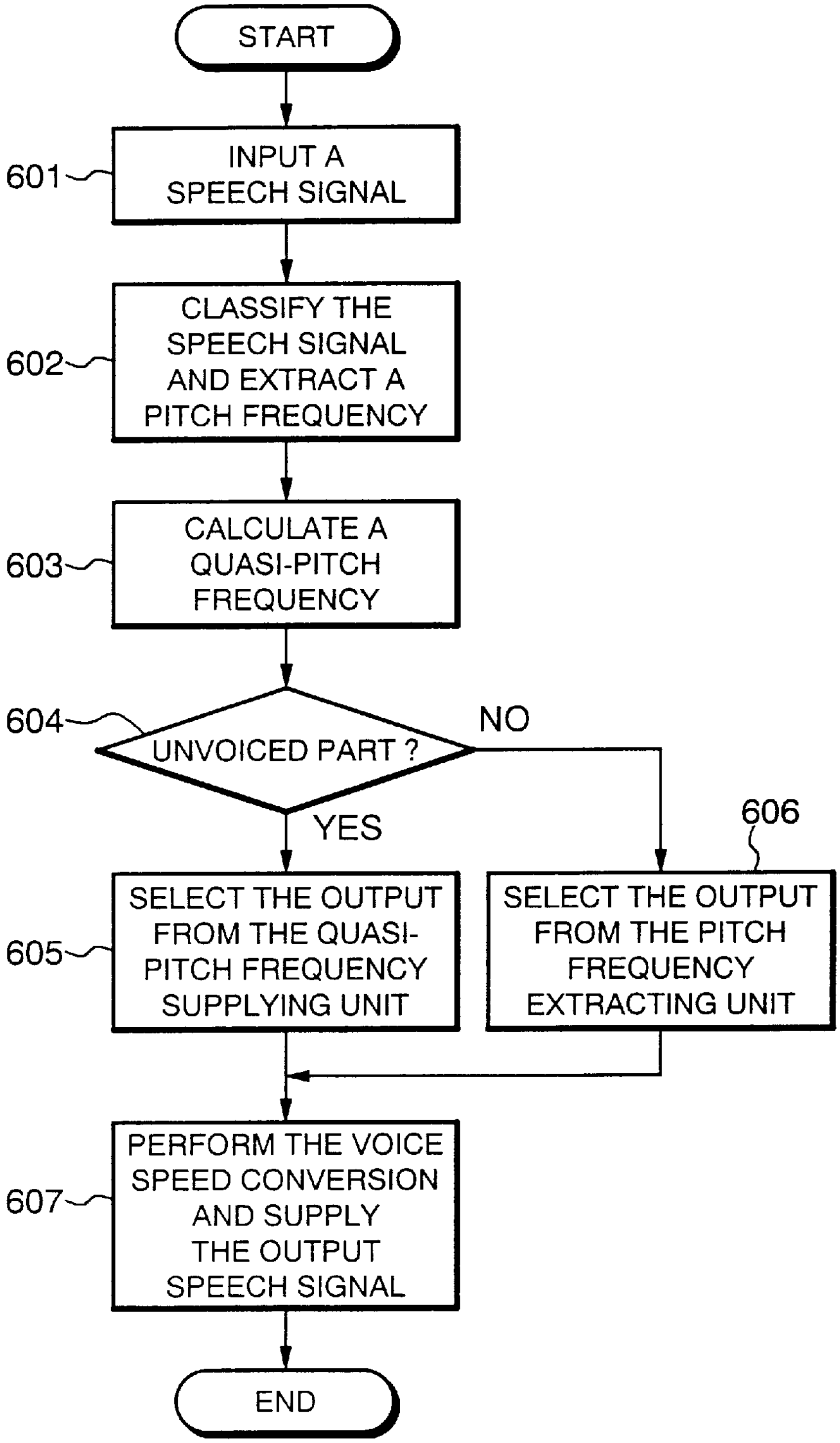
FIG. 6 is a flow chart showing the operation of the third embodiment.

This time, the operation of the voice speed converter of the embodiment will be described with reference to the flow chart of FIG. 6.

Upon receipt of the input speech signal X (Step 601), the speech classifying unit 101 classifies the input speech signal X into an unvoiced part and another part, so to supply the classification information M. Simultaneously, the pitch frequency extracting unit 102 extracts the pitch frequency of the input speech signal X and supplies the pitch frequency LAG (Step 602).

When the pitch frequency extracting unit 102 starts the output of the pitch frequency LAG, the quasi-pitch frequency supplying unit 501 receives the same pitch frequency LAG, calculates the average value of the pitch frequency LAG in the part other than the unvoiced part on the basis of the classification information M supplied from the speech classification unit 101, and supplies the obtained quasi-pitch frequency as the pitch frequency LAG (Step 603).

Next, the switch 105 connects either the pitch frequency extracting unit 102 or the quasi-pitch frequency supplying unit 501 to the voice speed converter 104 according to the classification information M so as to send the pitch frequency LAG (Steps 604, 605, and 606).

The voice speed converter 104 changes the voice speed of the input speech signal X according to a user's request by the use of the pitch frequency LAG received through the switch 105 and supplies the output speech signal Y (Step 607).

Figure 7:
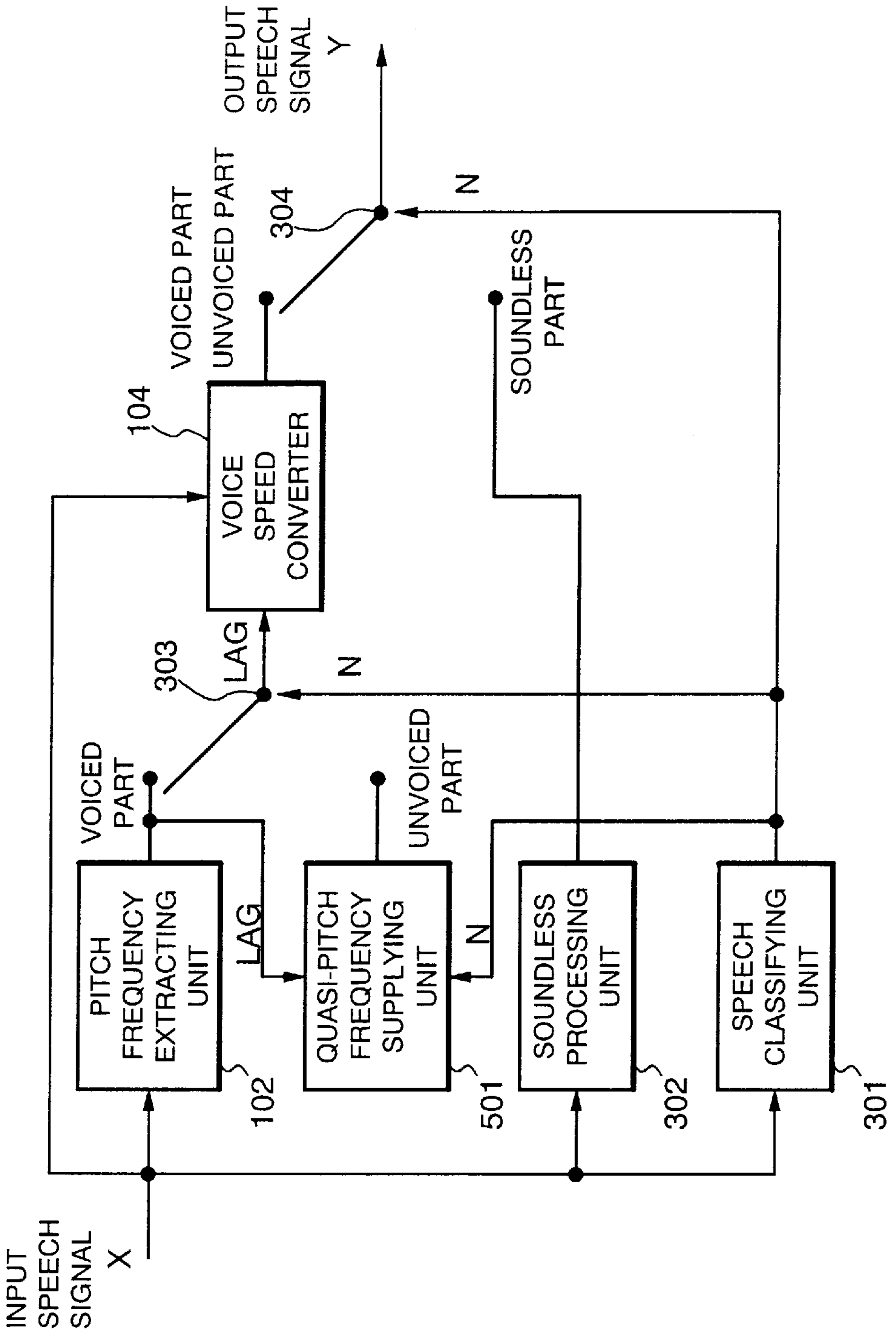
FIG. 7 is a block diagram showing a voice speed converter according to a fourth embodiment of the present invention.

FIG. 7 is a block diagram showing the constitution of a voice speed converter according to a fourth embodiment of the present invention.

In reference to FIG. 7, the voice speed converter of the embodiment comprises a speech classifying unit 301 for classifying an input speech signal into an unvoiced part, a voiced part, and a soundless part, a soundless processing unit 302 for performing soundless processing on the input speech signal, a pitch frequency extracting unit 102 for extracting the pitch frequency of the speech signal, a quasi-pitch frequency supplying unit 501 for supplying the quasi-pitch frequency determined according to the extraction result of the pitch frequency extracting unit 102, a voice speed converter 104 for changing the speed of the input speech signal according to the pitch frequency supplied from the pitch frequency extracting unit 102 or the quasi-pitch frequency supplied from the quasi-pitch frequency supplying unit 103, a first switch 303 for switching the connecting relation; the voice speed converter 104—the pitch frequency extracting unit 102 and the voice speed converter 104—the quasi-pitch frequency supplying unit 103, and a second switch 304 for supplying either the speech signal having the speed changed by the voice speed converter 104 or the speech signal having the soundless processing performed by the soundless processing unit 302 selectively as the output speech signal. FIG. 7 shows only the characteristic components of the embodiment, while omitting the description of the other general components.

Of the above components, the pitch frequency extracting unit 102 and the voice speed converter 104 have the same structure as the respective components of the above-mentioned first embodiment. The speech classification unit 301, the soundless processing unit 302, the first switch 303, and the second switch 304 have the same structure as the respective components of the above-mentioned second embodiment. The quasi-pitch frequency supplying unit 501 has the same structure as the third embodiment. The description thereof is omitted with the identical reference numerals respectively attached thereto.

Figure 8:
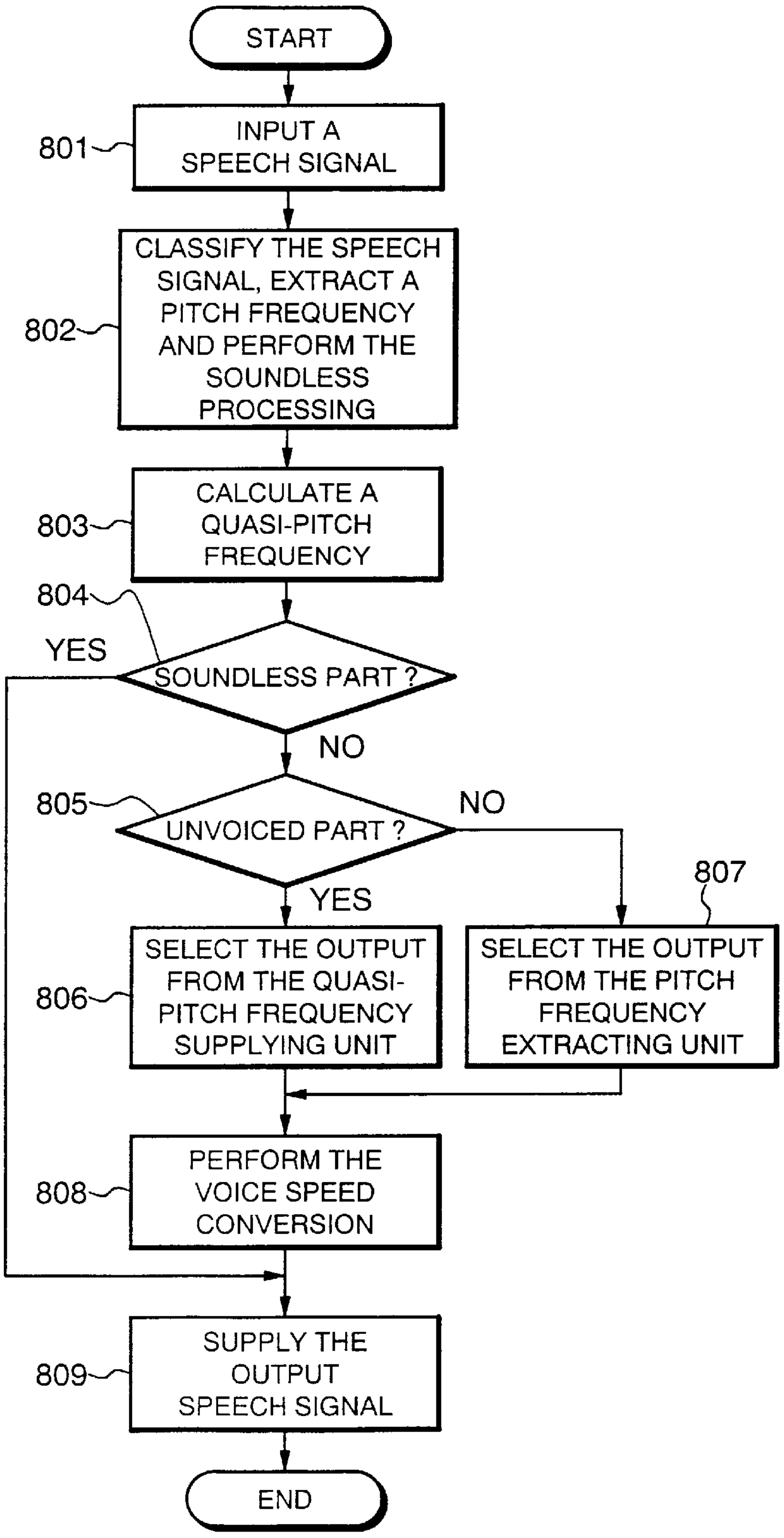
FIG. 8 is a flow chart showing the operation of the fourth embodiment.

This time, the operation of the voice speed converter of the embodiment will be described with reference to the flow chart of FIG. 8.

Upon receipt of the input speech signal X (Step 801), the speech classifying unit 301 classifies the input speech signal X into an unvoiced part, a voiced part, and a soundless part, and supplies the classification information N. Simultaneously, the pitch frequency extracting unit 102 extracts the pitch frequency from the input speech signal X and supplies the pitch frequency LAG. The soundless processing unit 302 performs the soundless processing on the speech signal in response to a user's request and supplies it (Step 802).

When the pitch frequency extracting unit 102 starts the output of the pitch frequency LAG, the quasi-pitch frequency supplying unit 501 receives the same pitch frequency LAG, calculates the average value of the pitch frequency LAG in the part other than the unvoiced part according to the classification information M supplied from the speech classifying unit 301, and supplies the obtained quasi-pitch frequency as the pitch frequency LAG (Step 803).

Next, the second switch 304 supplies the output either from the voice speed converter 104 or from the soundless processing unit 302 according to the classification information N (Step 804). The first switch 303 connects either the pitch frequency extracting unit 102 or the quasi-pitch frequency supplying unit 501 to the voice speed converter 104 (Steps 805, 806, and 807).

The voice speed converter 104 changes the voice speed of the input speech signal X in response to a user's request by the use of the pitch frequency LAG received via the switch 303 and supplies it (Step 808).

Finally, either the output of the voice speed converter 104 or the output of the soundless processing unit 302 is supplied as the output speech signal Y depending on the state of the second switch 304 (Step 809).

Although the embodiments of the present invention have been described as mentioned above, as the method of classifying an input speech signal into an unvoiced part, a soundless part, and a voiced part, various conventional methods can be used, such as a classifying method by the use of the intensity of the pitch frequency of the input speech signal used in "M-LCELP speech sound coding method", in addition to the classifying method depending on the existence of the sound power and the analytical result of the PARCOR analysis or the zero crossing point analysis. The unvoiced part may be further divided into an unvoiced portion and a transition portion.

As the pitch frequency extracting method, various conventional methods such as the cepstrum method can be used other than the autocorrelation method as mentioned above.

As the method of generating the quasi-pitch frequency, a representative pitch frequency value out of the extracted pitch frequencies can be used, in addition to the use of the average value of the pitch frequencies extracted from the input speech signal as mentioned above.

As the voice speed conversion method, in addition to the TDHS method as mentioned above, various conventional methods such as the waveform repetition or thinning-out processing by the unit of pitch frequency can be used.

As set forth hereinabove, according to the voice speed converter of the present invention, the use of a stable quasi-pitch for the voice speed conversion in an unvoiced part can prevent from the deterioration in the quality of the speed-converted speech, thereby obtaining the output speech signal of high quality.

Further, the use of the quasi-pitch for the voice speed conversion in the unvoiced part can prevent the voice speed changing partially, thereby preventing from making the reproduced speech unnatural hearing.

Further, the present invention can prevent the conventional problem such that decrease in the possible parts of changing the voice time length causes decrease in the degree of freedom of controlling the voice speed conversion power when the voice speed conversion is not performed in the unvoiced part.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A voice speed converter that performs voice speed conversion processing of changing only the reproduction speed of an input speech signal without changing the pitch and tone of the voice, comprising:

a speech classifying means for classifying the input speech signal at least into an unvoiced part and another part and supplying classification information indicating the classification result;

a pitch frequency extracting means for extracting a pitch frequency of the input speech signal and supplying it;

a quasi-pitch frequency supplying means for supplying a quasi-pitch frequency of a predetermined fixed length value;

a voice speed converting means for performing the voice speed conversion processing on the input speech signal by the use of the pitch frequency supplied from said pitch frequency extracting means or the quasi-pitch frequency supplied from said quasi-pitch frequency supplying means and supplying the speech signal having voice time length converted; and a switching means for controlling switching operations according to the classification information supplied from said speech classifying means, so as to send to said voice speed converting means the quasi-pitch frequency supplied from said quasi-pitch frequency supplying means when the input speech signal belongs to the unvoiced part, or so as to send to said voice speed converting means the pitch frequency supplied from said pitch frequency extracting means when the input speech signal belongs to another part.

2. A voice speed converter as set forth in claim 1, wherein the quasi-pitch frequency supplied from said quasi-pitch frequency supplying means takes an arbitrary value selected from the range of pitch frequencies obtained based on the possible frequency band of the human voice.

3. A voice speed converter as set forth in claim 1, wherein said speech classifying means for classifying the input speech signal into a soundless part, a voiced part of a sound part, and an unvoiced part thereof and supplying the classification result as the classification information, said switching means for controlling switching operations according to the classification information supplied from said speech classifying means, so as to send to said voice speed converting means the quasi-pitch frequency supplied from said quasi-pitch frequency supplying means when the input speech signal belongs to the unvoiced part, or so as to send to said voice speed converting means the pitch frequency supplied from said pitch frequency extracting means when the input speech belongs to the voiced part, wherein further comprising a soundless processing means for simply making the voice time length of the input speech signal longer and shorter corresponding to a long to short ratio of the voice time length in the processing by said voice speed converting means and supplying the same, and a second switching means for controlling switching operations according to the classification information supplied from said speech classifying means, so as to supply the voice speed-converted speech signal supplied from said voice speed converting means when the input speech signal belongs to the unvoiced part or the voiced part, or so as to supply the speech signal after the soundless processing, supplied from said soundless processing means when the input speech signal belongs to the soundless part.

4. A voice speed converter as set forth in claim 1, wherein said speech classifying means for classifying the input speech signal into a soundless part, a voiced part of a sound part, and an unvoiced part thereof and supplying the classification result as the classification information, said switching means for controlling switching operations according to the classification information supplied from said speech classifying means, so as to send to said voice speed converting means the quasi-pitch frequency supplied from said quasi-pitch frequency supplying means when the input speech signal belongs to the unvoiced part, or so as to send to said voice speed converting means the pitch frequency supplied from said pitch frequency extracting means when the input speech belongs to the voiced part, wherein further comprising a soundless processing means for simply making the voice time length of the input speech signal longer and shorter corresponding to a long to short ratio of the voice time length in the processing by said voice speed converting means and supplying the same, and a second switching means for controlling switching operations according to the classification information supplied from said speech classifying means, so as to supply the voice speed-converted speech signal supplied from said voice speed converting means when the input speech signal belongs to the unvoiced part or the voiced part, or so as to supply the speech signal after the soundless processing, supplied from said soundless processing means when the input speech signal belongs to the soundless part, the quasi-pitch frequency supplied from said quasi-pitch frequency supplying means takes an arbitrary value selected from the range of pitch frequencies obtained based on the possible frequency band of the human voice.

5. A voice speed converter performing voice speed conversion processing of changing only the reproduction speed of an input speech signal without changing the pitch and tone of the voice, comprising:

a speech classifying means for classifying the input speech signal at least into an unvoiced part and another part and supplying classification information indicating the classification result;

a pitch frequency extracting means for extracting a pitch frequency of the input speech signal and supplying it;

a quasi-pitch frequency supplying means for receiving a pitch frequency that is the output from said pitch frequency extracting means with respect to the part other than the unvoiced part, according to the classification information supplied from said speech classifying means and supplying a quasi-pitch frequency of fixed length obtained based on the pitch frequency;

a voice speed converting means for performing the voice speed conversion processing on the input speech signal by the use of the pitch frequency supplied from said pitch frequency extracting means or the quasi-pitch frequency supplied from said quasi-pitch frequency supplying means and supplying the speech signal having voice time length converted; and a switching means for controlling switching operations according to the classification information supplied from said speech classifying means, so as to send to said voice speed converting means the quasi-pitch frequency supplied from said quasi-pitch frequency supplying means when the input speech signal belongs to the unvoiced part, or so as to send to said voice speed converting means the pitch frequency supplied from said pitch frequency extracting means when the input speech signal belongs to another part.

6. A voice speed converter as set forth in claim 5, in which the quasi-pitch frequency supplied from said quasi-pitch frequency supplying means takes the average value of the pitch frequencies received from said pitch frequency extracting means.

7. A voice speed converter as set forth in claim 5, in which the quasi-pitch frequency supplied from said quasi-pitch frequency supplying means takes the representative value selected according to a predetermined rule from the pitch frequencies received from said pitch frequency extracting means.

8. A voice speed converter as set forth in claim 5, wherein said speech classifying means for classifying the input speech signal into a soundless part, a voiced part of a sound part, and an unvoiced part thereof and supplying the classification result as the classification information, said switching means for controlling switching operations according to the classification information supplied from said speech classifying means, so as to send to said voice speed converting means the quasi-pitch frequency supplied from said quasi-pitch frequency supplying means when the input speech signal belongs to the unvoiced part, or so as to send to said voice speed converting means the pitch frequency supplied from said pitch frequency extracting means when the input speech belongs to the voiced part, wherein further comprising a soundless processing means for simply making the voice time length of the input speech signal longer and shorter corresponding to a long to short ratio of the voice time length in the processing by said voice speed converting means and supplying the same, and a second switching means for controlling switching operations according to the classification information supplied from said speech classifying means, so as to supply the voice speed-converted speech signal supplied from said voice speed converting means when the input speech signal belongs to the unvoiced part or the voiced part, or so as to supply the speech signal after the soundless processing, supplied from said soundless processing means when the input speech signal belongs to the soundless part.

9. A voice speed converter as set forth in claim 5, wherein said speech classifying means for classifying the input speech signal into a soundless part, a voiced part of a sound part, and an unvoiced part thereof and supplying the classification result as the classification information, said switching means for controlling switching operations according to the classification information supplied from said speech classifying means, so as to send to said voice speed converting means the quasi-pitch frequency supplied from said quasi-pitch frequency supplying means when the input speech signal belongs to the unvoiced part, or so as to send to said voice speed converting means the pitch frequency supplied from said pitch frequency extracting means when the input speech belongs to the voiced part, and wherein further comprising a soundless processing means for simply making the voice time length of the input speech signal longer and shorter corresponding to a long to short ratio of the voice time length in the processing by said voice speed converting means and supplying the same, and a second switching means for controlling switching operations according to the classification information supplied from said speech classifying means, so as to supply the voice speed-converted speech signal supplied from said voice speed converting means when the input speech signal belongs to the unvoiced part or the voiced part, or so as to supply the speech signal after the soundless processing, supplied from said soundless processing means when the input speech signal belongs to the soundless part, wherein the quasi-pitch frequency supplied from said quasi-pitch frequency supplying means takes the average value of the pitch frequencies received from said pitch frequency extracting means.

10. A voice speed converter as set forth in claim 5, wherein said speech classifying means for classifying the input speech signal into a soundless part, a voiced part of a sound part, and an unvoiced part thereof and supplying the classification result as the classification information, said switching means for controlling switching operations according to the classification information supplied from said speech classifying means, so as to send to said voice speed converting means the quasi-pitch frequency supplied from said quasi-pitch frequency supplying means when the input speech signal belongs to the unvoiced part, or so as to send to said voice speed converting means the pitch frequency supplied from said pitch frequency extracting means when the input speech belongs to the voiced part, wherein further comprising a soundless processing means for simply making the voice time length of the input speech signal longer and shorter corresponding to a long to short ratio of the voice time length in the processing by said voice speed converting means and supplying the same, and a second switching means for controlling switching operations according to the classification information supplied from said speech classifying means, so as to supply the voice speed-converted speech signal supplied from said voice speed converting means when the input speech signal belongs to the unvoiced part or the voiced part, or so as to supply the speech signal after the soundless processing, supplied from said soundless processing means when the input speech signal belongs to the soundless part, wherein the quasi-pitch frequency supplied from said quasi-pitch frequency supplying means takes the representative value selected according to a predetermined rule from the pitch frequencies received from said pitch frequency extracting means.

* * * * *